(12) United States Patent
Breon

(10) Patent No.: US 11,022,583 B2
(45) Date of Patent: Jun. 1, 2021

(54) APPARATUS AND METHOD FOR FABRICATING ULTRASONIC SENSOR PROBES DIRECTLY ON A SUBSTRATE SURFACE AND USING SAME

(71) Applicant: Electric Power Research Institute, Palo Alto, CA (US)

(72) Inventor: Luke Justin Breon, Concord, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 49 days.

(21) Appl. No.: 16/155,735

(22) Filed: Oct. 9, 2018

(65) Prior Publication Data
US 2020/0110059 A1   Apr. 9, 2020

(51) Int. Cl.
*G01N 29/24*   (2006.01)

(52) U.S. Cl.
CPC ... *G01N 29/2475* (2013.01); *G01N 2291/106* (2013.01)

(58) Field of Classification Search
CPC ............... G01N 29/2475; G01N 2291/106
USPC .......................................................... 73/661
See application file for complete search history.

(56) References Cited

U.S. PATENT DOCUMENTS

| | | | | |
|---|---|---|---|---|
| 6,561,034 | B2 * | 5/2003 | Benjamin | G01H 11/08 310/334 |
| 6,569,710 | B1 * | 5/2003 | Pierson | H01L 23/5385 257/685 |
| 7,079,881 | B2 * | 7/2006 | Schulman | A61B 5/14532 257/E23.124 |
| 7,889,601 | B2 * | 2/2011 | Goodmote | G10K 11/008 367/153 |
| 7,900,520 | B2 * | 3/2011 | Colombo | G01L 19/147 257/419 |
| 9,317,154 | B2 * | 4/2016 | Perlin | G06F 3/011 |
| 2002/0007677 | A1 * | 1/2002 | Coates | G01C 9/06 73/514.16 |
| 2015/0253495 | A1 * | 9/2015 | Matsumoto | G06F 3/044 345/174 |
| 2017/0115768 | A1 * | 4/2017 | Shih | G06F 3/0412 |

* cited by examiner

*Primary Examiner* — Octavia Hollington
(74) *Attorney, Agent, or Firm* — Owens Law Firm, PC

(57) ABSTRACT

The invention comprises methods for fabricating and using a plurality of sensors on a substrate surface, such as ultrasonic sensor probes. The methods for fabricating sensors directly on the substrate surface includes the use of a template to dispose sensor material in an array and form a first layer on the substrate surface and a second template to dispose sensor electrode material in a corresponding array to form a second layer on top of the first layer. The invention provides a sensor housing that electrically connects the sensors and a computing device. The sensor housing may comprise a flexible circuit having a plurality of sensor electrode contact points corresponding to each of the sensors, at least one spring plate, a force distribution plate, and a plurality of cable wires attached to the flexible circuit and corresponding to each of sensor electrode contact points.

18 Claims, 13 Drawing Sheets

APPARATUS AND METHOD FOR FABRICATING ULTRASONIC SENSOR PROBES DIRECTLY ON A SUBSTRATE SURFACE AND USING SAME

BACKGROUND OF THE INVENTION

Field of the Invention

The invention in its various embodiments relates generally to a sol-gel phased array probe and methods for installing and using the same on a substrate of interest. In particular, the invention in its various embodiments relates to a sol-gel phased array probe that can be fabricated directly on the surface of the substrate of interest and used, for example, for nondestructive testing in an environment with high temperatures or high amounts of radiation.

Description of Related Art

Ultrasonic probes or sensors are typically used to conduct measurements on various surfaces and surface types. However, measurements may be difficult to collect in challenging environments, such as high-temperature or high-radiation environments. It may be additionally difficult to deploy sensors in such challenging environments since most sensor measurement apparatuses are pre-constructed in a laboratory or factory, thus requiring bonding to the surface of interest in the field. For example, manual scanning is typically done by a technician using portable technology that requires access to the surface of interest and is subject to improper probe placement on that surface. Also such generally requires matching, bonding, and possibly the use of couplant layers. Accordingly, such technology cannot be used in high temperature environments and often cannot be done when the surface of interest is in use, such as during operation of an industrial plant, such as a nuclear power plant.

Therefore, there is a need for an apparatus and a means to enable sensors to conduct measurements directly on substrate surfaces, including surfaces associated with high-temperature or high-radiation environments, in a simple and inexpensive fashion. In particular, there is a need for a sol-gel phased array that can be fabricated or constructed on the surface of interest, as opposed to a pre-fabricated array that requires bonding to the surface of interest in the field. In addition, there is a need for such a sol-gel phased array that can be permanently fabricated on the surface of interest, which could lead to higher safety at industrial plants and less personnel exposure to environments having high temperature or radiation doses, in addition to the other cost benefits.

BRIEF SUMMARY OF THE INVENTION

Generally, the invention comprises apparatuses and methods for fabricating a plurality of sensors directly on a substrate surface, including, but not limited to, metal surfaces, that can be used to measure various characteristics of a substrate of interest. The plurality of sensors may, in some instances, comprise a plurality of ultrasonic sensor probes that use ultrasonic waves to provide data regarding the substrate of interest. In some embodiments of the invention, the plurality of sensors may be organized into a probe array, such as a slurry-based, spray-on, or thick-film phased array, which itself may be arranged in a variety of roughly geometric formations, including, but not limited to, a rectangular formation. Further, in certain embodiments of the invention, the substrate surface may be located in a high-temperature or high-radiation environment, including, but not limited to, nuclear infrastructures.

The apparatus of the present invention generally comprises a sensor housing assembly that physically contacts a plurality of sensors that have been fabricated directly on the substrate of interest and provides an electrical connection between the sensors and a computing device. In some embodiments, the sensor housing comprises a flexible circuit having a flat portion comprising a first plurality of electrical contacts disposed on top of, and electrically connected to, the plurality of sensors and a second portion comprising a second plurality of electrical contacts for electrical connection to a corresponding plurality of wires; a first plate disposed on top of the flat portion of the flexible circuit configured to exert a downward force on the flat portion of the flexible circuit; a second plate having a top surface and disposed on top of the first plate; a body that encloses the flat portion of the flexible circuit, the first plate, and the second plate and that is disposed around or on top of the plurality of sensors, wherein the body defines a first opening and at least one second opening and wherein the flexible circuit extends through the first opening such that the second portion of the flexible circuit is disposed outside of said body; and at least one set screw disposed within the at least one second opening of the body and in contact with the top surface of the second plate. In another embodiment, the sensor housing further comprises a plurality of wires electrically connected to the second plurality of electrical contacts; and a conduit connected at a first end to the housing at the first opening and wherein the plurality of wires extend from the second plurality of electrical contacts through the conduit for electrical connection at a second end of the conduit to a computing device.

The invention in its various embodiments also comprises methods for fabricating or installing the plurality of sensors directly on the substrate surface. In one embodiment, a method for fabricating a sensor array on the surface of a substrate comprises attaching a first template comprising a first plurality of openings to a surface of a substrate; disposing a sensor material into each of the openings in the first template; attaching a second template comprising a second plurality of openings on top of the first template; and disposing an electrode material into each of the openings in the second template.

The invention in its various embodiments also comprises methods for using the invention to measure and collect data regarding the substrate. In one embodiment, a method of fabricating a plurality of sensors directly on a substrate surface as described may be used followed by placing the sensor housing assembly as described above on the plurality of sensors; and utilizing the plurality of sensors to conduct at least one measurement on the substrate.

It should be appreciated that, in the methods described above, the plurality of sensor elements and sensor electrodes are affixed directly to the plurality of sensor active elements, thereby fabricating a plurality of sensors in place on the surface of the substrate of interest. It should further be appreciated that a user utilizing the methods described above need not place any additional material between the plurality of sensor elements and the plurality of sensor electrodes, including, but not limited to, a glue layer, a couplant layer, or the like. In addition, because the plurality of active sensor elements are fabricated directly onto the surface of interest, no bonding layer between the plurality of active sensor elements and the surface of interest is required. One of skill in the art will therefore recognize that the method as described above provides a more efficient and robust method of fabricating and installing a plurality of sensors on a substrate surface.

Additionally, a skilled artisan will appreciate that the method discloses a means to install a plurality of sensors on any substrate surface without a need to manufacture any of the plurality of sensors in a laboratory or factory prior to installation, thereby avoiding issues, such as geometric compatibility, with installing such a pre-fabricated device to a surface of interest in the field. Thus, a user utilizing the above method may install the plurality of sensors at any site of interest, including, but not limited to, any field site or any field measurement site, without a need to manufacture any of the plurality of sensors beforehand. It should, therefore, be appreciated that the method described above allows field deployment of a plurality of sensors, including, but not limited to, a plurality of ultrasonic sensor probes, in an easy and readily-accessible manner.

DETAILED DESCRIPTION OF THE INVENTION

Figure 1:
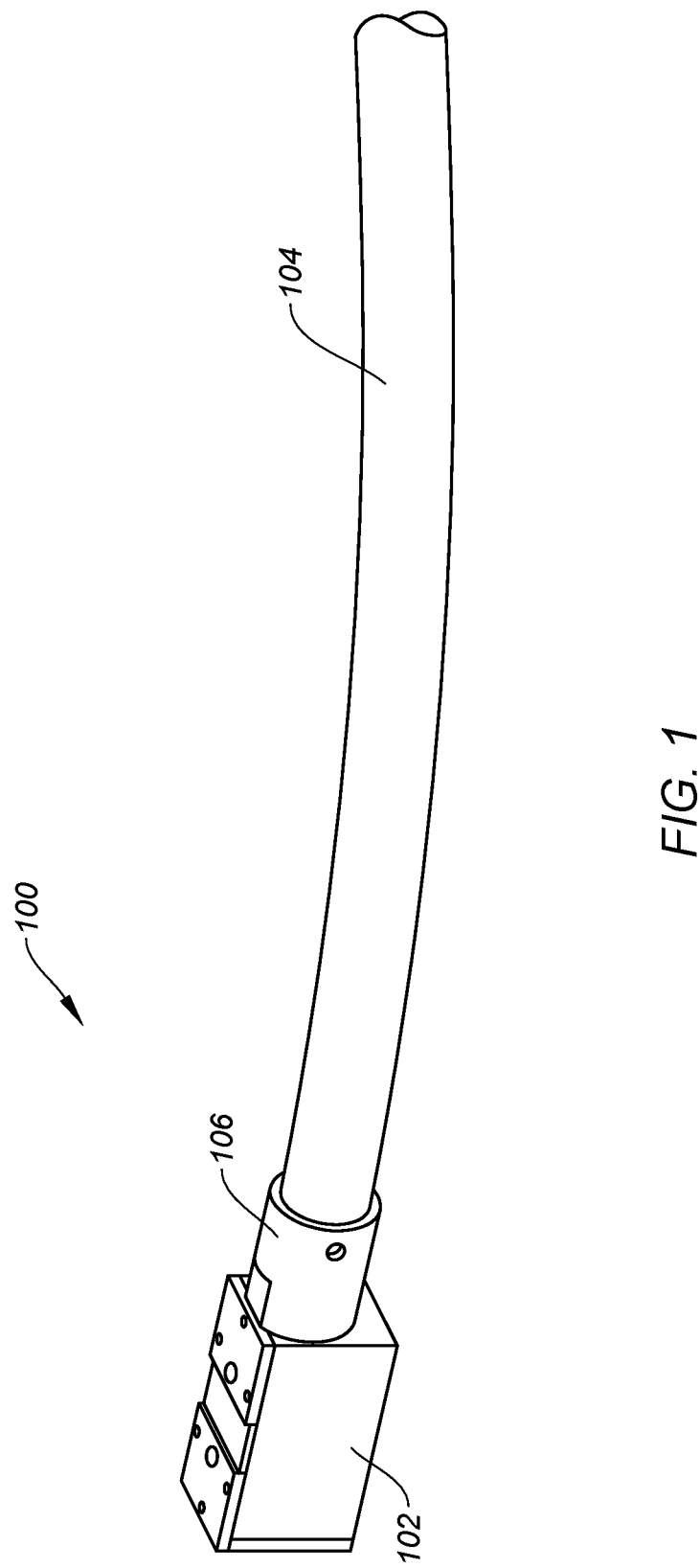
FIG. 1 illustrates a side perspective view of a sensor housing assembly according to one embodiment of the present invention.

The present invention is more fully described below with reference to the accompanying Figures. While the invention will be described in conjunction with particular embodiments, it should be understood that the invention includes alternatives, modifications, and equivalents. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

Generally, the invention comprises apparatuses and methods for fabricating a plurality of sensors directly on a substrate surface, including, but not limited to, metal surfaces, that can be used to measure various characteristics of a substrate of interest. The plurality of sensors may, in some instances, comprise a plurality of ultrasonic sensor probes that use ultrasonic waves to provide data regarding the substrate of interest. In some embodiments of the invention, the plurality of sensors may be organized into a probe array, such as one constructed using a sol-gel or slurry-based, spray-on, or thick-film phased array, which itself may be arranged in a variety of roughly geometric formations, including, but not limited to, a rectangular formation. Further, in certain embodiments of the invention, the substrate surface may be located in a high-temperature or high-radiation environment, including, but not limited to, nuclear infrastructures.

In one embodiment, the apparatus of the present invention comprises a sensor housing assembly that physically contacts a plurality of sensors that have been fabricated directly on the substrate of interest. In certain embodiments of the invention, the sensor housing assembly comprises a sensor housing unit, a flexible circuit having a plurality of sensor electrode contact points for electrically connecting to a corresponding plurality of sensors located on a surface of interest, such as a slurry-based, spray-on, or thick-film phased array, and a plurality of connector busses for connection to a corresponding plurality of wire or cable leads, at least one spring plate, at least one force distributor plate, and a cable conduit attached to the sensor housing unit using a cable bracket or connector. The sensor housing unit physically holds the flexible circuit so that the plurality of sensor electrode contact points physically contact the corresponding plurality of sensors or the slurry-based, spray-on, or thick-film phased array on the surface of interest, thus creating an electrical connection between the sensor housing assembly and the plurality of sensors. The spring plate is disposed on top of the flexible circuit to further enable the physical contact between the plurality of sensor electrode contact points and the plurality of sensors. A force distributor plate is disposed on top of the spring plate to further enable the physical contact between the plurality of sensor electrode contact points and the plurality of sensors. The plurality of connector busses are electrically connected to a plurality of wire or cable leads that pass through the cable conduit to a pulser, computer, or computer processor. As a result, the plurality of sensors may transmit, via electrical signals, information or data regarding the substrate of interest collected by the plurality of sensors, such as a slurry-based, spray-on, or thick-film phased array, through the flexible circuit to a corresponding plurality of wire or cable leads cables and ultimately to a pulser, computer, or computer processor for use by an end user or application.

It should be appreciated that in at least some of the embodiments of the present invention, the sensor housing assembly does not comprise a cable insulator of any kind, such as a glass cable insulator, a ceramic cable insulator, or the like. The sensor housing assembly may, therefore, enable a user to more easily conduct measurements in a challenging environment, such as a high-temperature or high-radiation environment.

The invention in its various embodiments also comprises methods for fabricating or installing the plurality of sensors directly on the substrate surface, as well as using the invention to measure and collect data regarding the substrate. In one embodiment, a method of fabricating a plurality of sensors directly on a substrate surface includes affixing a plurality of active sensor elements to the substrate surface and a plurality of sensor electrodes to the plurality of active sensor elements, thereby creating a plurality of sensors; placing the sensor housing assembly as described above on the plurality of sensors; and utilizing the plurality of sensors to conduct at least one measurement on the substrate.

It should be appreciated that, in the method described above, the plurality of sensor electrodes is affixed directly to the plurality of sensor active elements, thereby creating a plurality of sensors. It should further be appreciated that a user utilizing the method described above need not place any additional material between the plurality of sensor elements and the plurality of sensor electrodes, including, but not limited to, a glue layer, a couplant layer, or the like. In addition, because the plurality of active sensor elements are fabricated directly onto the surface of interest, no bonding layer between the plurality of active sensor elements and the surface of interest is required. One of skill in the art will therefore recognize that the method as described above provides a more efficient and robust method of fabricating and installing a plurality of sensors on a substrate surface.

Additionally, a skilled artisan will appreciate that the method discloses a means to install a plurality of sensors on any substrate surface without a need to manufacture any of the plurality of sensors in a laboratory or factory prior to installation, thereby avoiding issues, such as geometric compatibility and time required to otherwise solder wires to each sensor, with installing such a pre-fabricated device to a surface of interest in the field. This is particularly important when placing a sensor or sensor array in a challenging environment, such as on a pipe that is radioactive. Thus, a user utilizing the above method may install the plurality of sensors at any site of interest, including, but not limited to, any field site or any field measurement site, without a need to manufacture any of the plurality of sensors beforehand. It should, therefore, be appreciated that the method described above allows field deployment of a plurality of sensors, including, but not limited to, a plurality of ultrasonic sensor probes, in an easy and readily-accessible manner. It should be appreciated that the plurality of sensors may be a sol-gel or slurry-based, spray-on, or thick-film phased array that has the necessary properties to function as an active element in a sensor.

Following, the apparatus of the present invention is described in more detail in conjunction with the accompanying Figures. Further, the methods of fabricating and installing the apparatus of the present invention, as well as methods for using the apparatus, are described in conjunction with the accompanying Figures.

FIG. 1 illustrates a side perspective view of a sensor housing assembly according to one embodiment of the present invention. As depicted in FIG. 1, the sensor housing assembly 100 comprises a sensor housing unit 102. The sensor housing unit 102 is used to physically contact a plurality of sensors installed directly on a substrate surface of interest. The substrate surface may, for example, be located in a challenging environment, including, but not limited to, a high-temperature environment, a high-radiation environment, or the like. As depicted in FIG. 1, the sensor housing assembly 100 is attached to a cable conduit 104 that holds at least one cable or wire. The sensor housing assembly 100 is attached to the cable conduit 104 using a cable bracket 106. One of skill in the art will appreciate that the cable conduit 104 may hold one or more wires or cables that transmit electrical signals to and from the plurality of sensors on the substrate surface to a desired pulser, computer, or computer processor. In some embodiments, one wire will be used for each sensor. It should be appreciated that the electrical signals from the substrate surface represent data collected by the plurality of sensors regarding characteristics or various aspects of the substrate of interest. The electrical signals can be transmitted to a pulser, computer, or computer processor for storage and further processing for use by an end user. Signals transmitted from the pulser, computer, or computer processor via the cable conduit 104 may include control signals to operate the plurality of sensors on the substrate of interest. It should also be appreciated that the cable conduit 104 may comprise one or more elements or be constructed of materials capable of functioning in a challenging environment, such as in a high-temperature or high-radiation environment. Thus, purely as a non-limiting example, the cable conduit 104 could comprise at least one high-temperature tolerant or radiation tolerant cable or wire.

Figure 2:
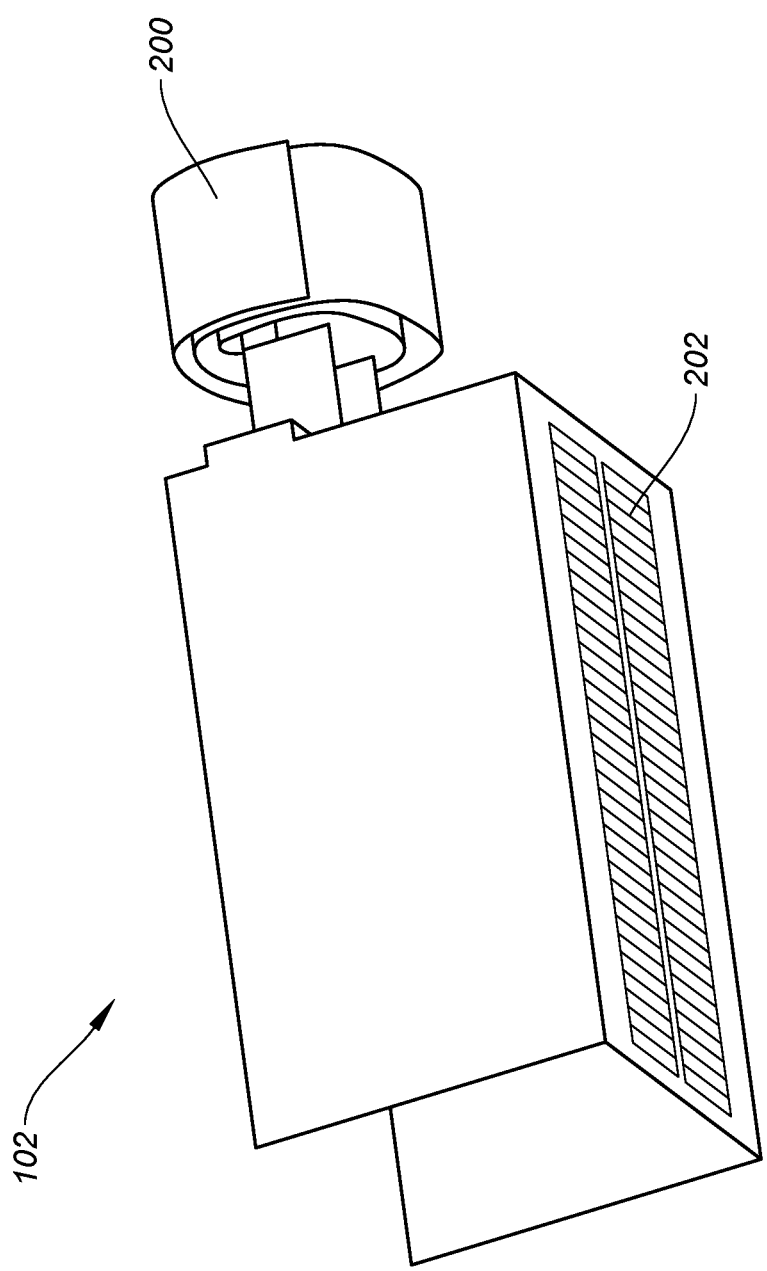
FIG. 2 illustrates a bottom perspective view of a flexible circuit for electrically connecting the sensors to wire leads according to one embodiment of the present invention.

FIG. 2 illustrates a bottom perspective view of a flexible circuit for electrically connecting the sensors to wire leads according to one embodiment of the present invention. As depicted, a flexible circuit 200 includes a plurality of sensor electrode contact points 202. The plurality of sensor electrode contact points 202 are designed to physically contact the plurality of sensors installed directly on the substrate of interest. One of skill in the art will appreciate that the plurality of sensors may comprise a plurality of sensor electrodes, as described elsewhere in the instant application. It should, therefore, be appreciated that the plurality of sensor electrode contact points 202 are exposed to permit physical contact with a plurality of sensor electrodes. It should further be appreciated that the plurality of sensor electrode contact points 202 may be oriented or arranged in the flexible circuit 200 in any manner known to a skilled artisan, including, but not limited to, an array.

The sensor electrode contact points 202 are used to pass electrical signals to and from the sensors. Accordingly, the flexible circuit 200 has tracings that electrically connect each of the sensor electrode contact points 202 with a corresponding wire or cable lead (not shown) that passes to a pulser, computer, or computer processor. Accordingly, the flexible circuit 200 acts to electrically connect the sensors with the wires that ultimately connect to a pulser, computer, or computer processor. The flexible circuit 200 is essentially flat and in use is conformed to the shape shown in FIG. 2. The flexible circuit 200 has tabs, such as soldering tabs, which serve as the sensor electrode contact points 202, on one side or end of the flexible circuit 200. Another set of tabs, such as soldering tabs, on the other side or end of the flexible circuit 200 are used to electrically connect the flexible circuit 200, via connector busses, to the wires or cable leads that pass through the cable conduit 104 to a pulser, computer, or computer processor. As depicted, the flexible circuit 200 is conformed to the shape shown, such that the tabs or the sensor electrode contact points 202 form a flat surface that can easily mate with the top of the corresponding plurality of sensors or sensor electrodes on the surface of interest. The remainder of the flexible circuit 200 can then be folded or coiled as shown on the right side of FIG. 2 to fit into the cable conduit 104 where the connector busses are attached to the wires or cable leads (not shown) that pass through the cable conduit 104 to a computer or computer processor. It should be appreciated that while the flexible circuit 200 shown in FIG. 2 shows that portion of the flexible circuit 200 having the exposed sensor electrode contact points 202 as being essentially flat, other geometries for that portion of the flexible circuit 200 may be used. For example, that portion of the flexible circuit may be curved to accommodate a curved surface of the corresponding sensors, such as when the sensors are applied to a pipe.

It should also be appreciated that the circuitry provided by the flexible circuit 200 may be provided by any appropriate vehicle for a circuit. For example, circuitry embodied in a pre-formed ceramic vehicle may be used, where the pre-formed ceramic has the necessary circuitry to electrically connect each of the sensor electrode contact points 202 with a corresponding wire or cable lead (not shown) and the desired shape to fit within the housing 102 and provide the necessary surface to electrically connect each of the sensor electrode contact points 202.

Figure 3:
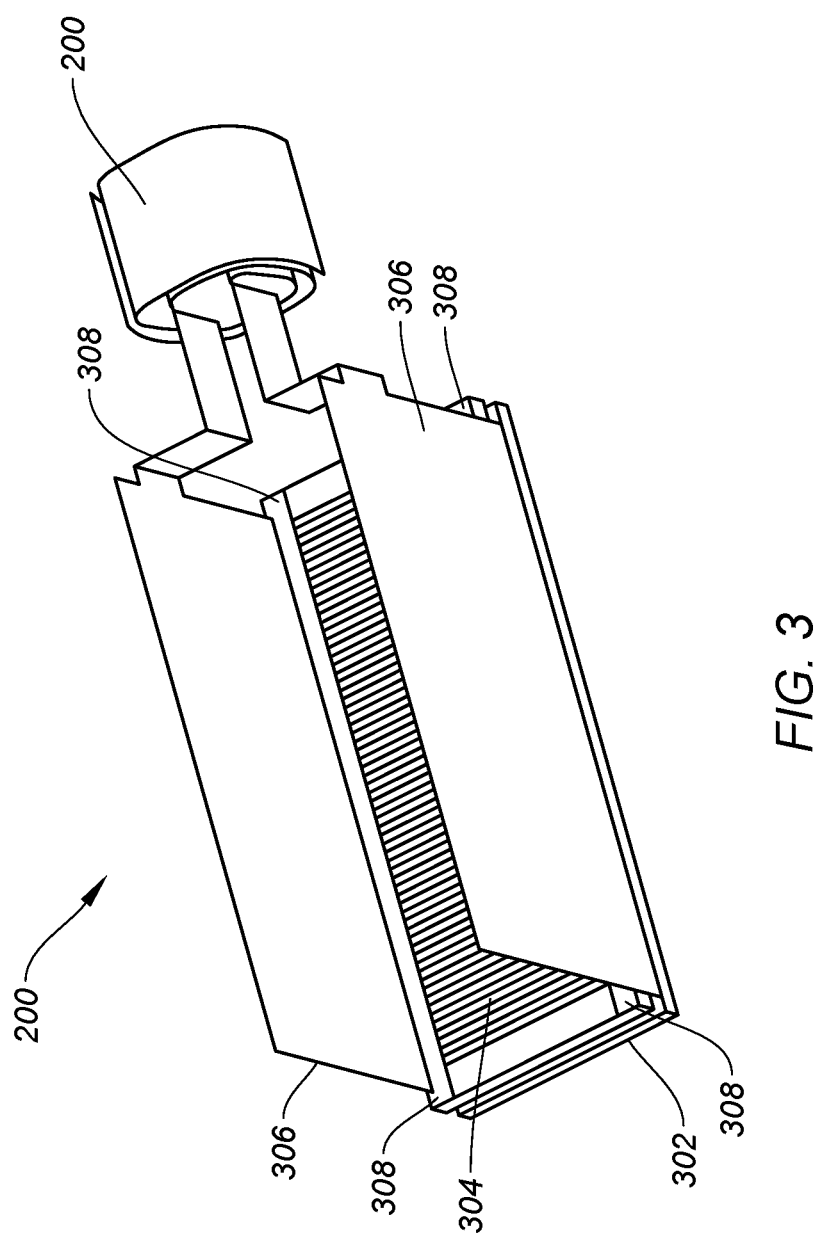
FIG. 3 illustrates a top perspective view of the flexible circuit of FIG. 2 according to one embodiment of the present invention.

FIG. 3 illustrates a top perspective view of the flexible circuit of FIG. 2 according to one embodiment of the present invention. The flexible circuit 200 is shown as disposed on top of a sensor array 302, such as a sol-gel phased array, which is disposed on top of a surface of a substrate of interest (not shown). The sensor array 302, which is a plurality of sensors within a housing separate from the sensor housing assembly 100, would be disposed on top of the surface of a substrate of interest and under the flexible circuit 200 such that the tabs or the sensor electrode contact points 202 (see FIG. 2) would be in physical contact with the underlying sensors. As depicted, a spring plate 304 is placed on top of that portion of the flexible circuit 200 comprising the tabs or the plurality of sensor electrode contact points 202. It should be appreciated that in one embodiment, the flexible circuit 200 is shaped so as to provide walls 306 that extend perpendicular to that portion of the flexible circuit 200 having the plurality of sensor electrode contact points 202, which is otherwise essentially flat. The spring plate 304 can be disposed within the walls 306 of the flexible circuit 200.

The spring plate 304 is used to exert force on the underlying plurality of sensor electrode contact points 202 to facilitate their physical contact with each corresponding sensor in the sensor array 302, thereby enabling, at least in part, transmission of electrical signals between the plurality of sensors and the plurality of sensor electrode contact points 202. In addition, at each of the four corners of the spring plate 304 are tabs 308 that can be used to align the flexible circuit 200 when being placed over the plurality of sensors 302 on the surface of the substrate of interest.

Figure 4:
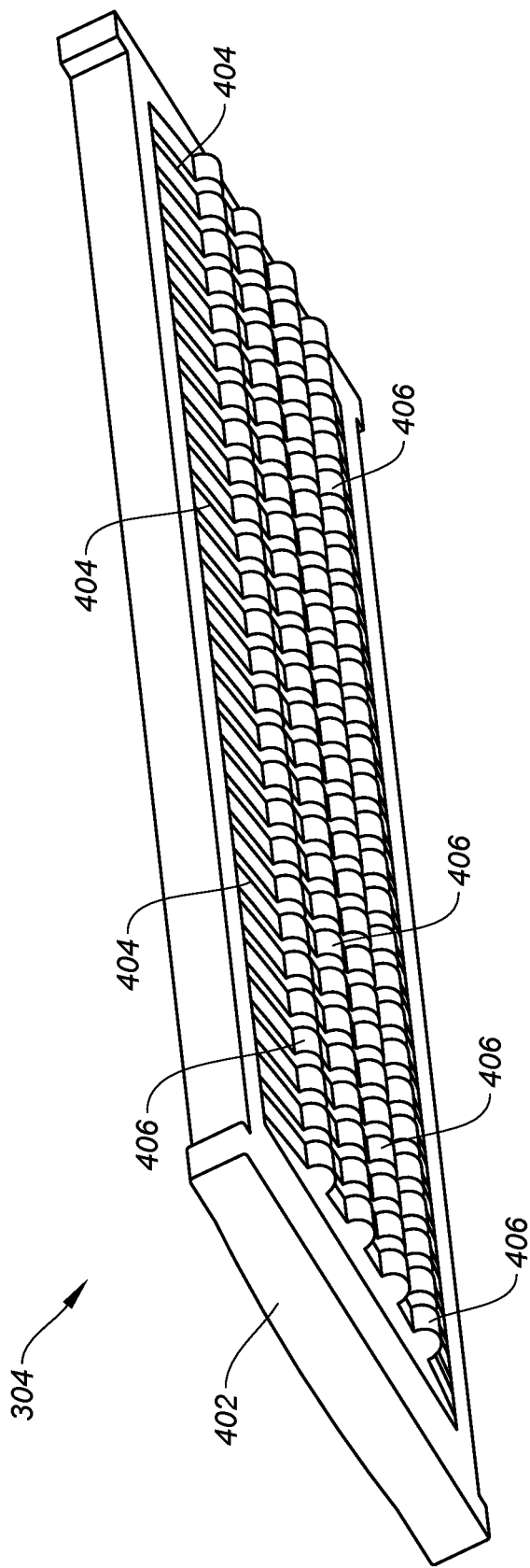
FIG. 4 illustrates a bottom perspective view of the spring plate of FIG. 3 according to one embodiment of the present invention.

FIG. 4 illustrates a bottom perspective view of the spring plate of FIG. 3 according to one embodiment of the present invention. The spring plate 304 includes a housing 402 having a perimeter that conforms to the shape of that portion of the flexible circuit 200 having the plurality of sensor electrode contact points 202. As shown, in one embodiment, the perimeter of the housing 402 is rectangular in shape. The housing 402 forms an opening across which a plurality of parallel flexible springs 404 extends. The springs 404 may be flat rectangular bands of metal or other material having semicircular protrusions 406 that extend in a downward direction that are biased to exert a downward force on the plurality of sensor electrode contact points 202. Accordingly, when the spring plate 304 is disposed on top of that portion of the flexible circuit 200 having the plurality of sensor electrode contact points 202, it will provide a downward force on that portion of the flexible circuit 200 to further or to ensure the physical contact between that portion of the flexible circuit 200 having the plurality of sensor electrode contact points 202 and the corresponding plurality of sensors on the surface of the substrate of interest, thereby furthering the electrical connection between the plurality of sensor electrode contact points 202 and the sensors on the surface of the substrate of interest.

Figure 5:
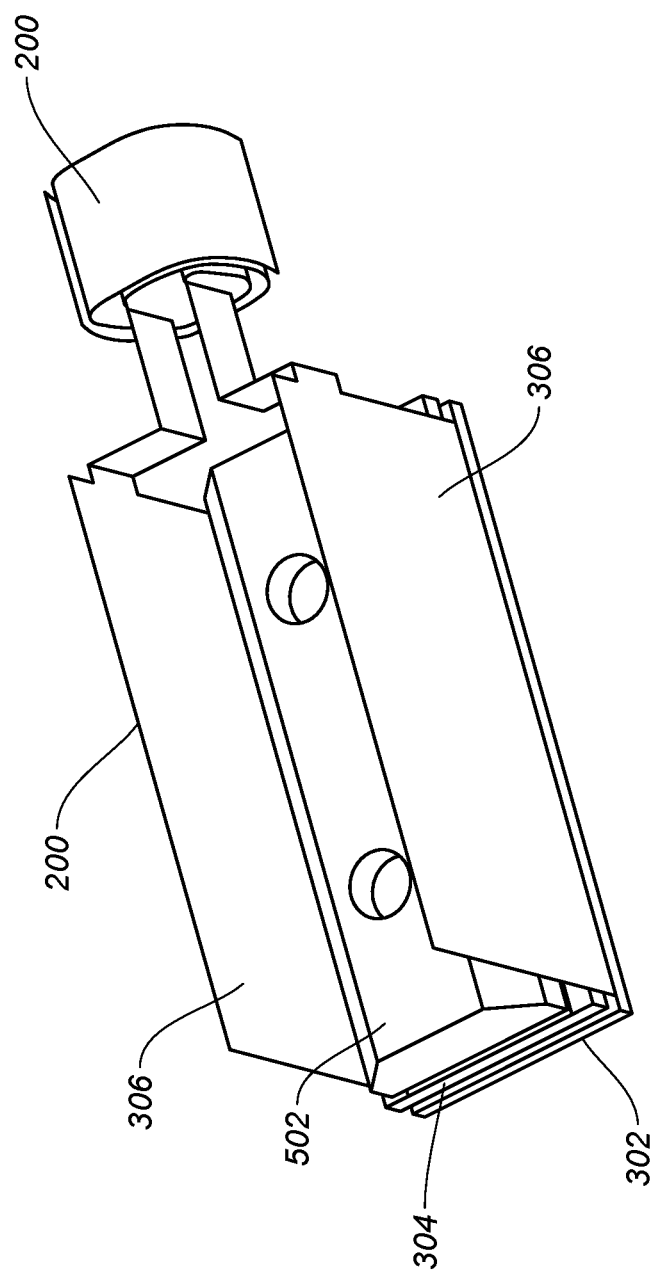
FIG. 5 illustrates a top perspective view of the flexible circuit of FIG. 3 according to one embodiment of the present invention.

FIG. 5 illustrates a top perspective view of the flexible circuit of FIG. 3 according to one embodiment of the present invention. As depicted, that portion of the flexible circuit 200 having the plurality of sensor electrode contact points 202 (see FIG. 2) is disposed on top of a plurality of sensors or sensor array 302, which is disposed on the surface of a substrate (not shown). The spring plate 304 is disposed on top of that portion of the flexible circuit 200 comprising the tabs or the plurality of sensor electrode contact points 202. In this embodiment, a force distributor plate 502 is disposed on top of the spring plate 304, as shown in FIG. 3. The body of the force distributor plate 502 may be any shape but is contoured to ensure that a downward force exerted by the force distributor plate 502 is substantially the same across the entire bottom surface area of the force distributor plate 502 so as to force the spring plate 304 downward evenly. Similar to the spring plate 304, the force distributor plate 502 may also be shaped to fit within the walls 306 formed by the flexible circuit 200. The top surface of the body of the force distributor plate 502 has two holes for receipt of set screws that can be used to provide additional downward force on the force distribute plate 502 and to maintain the force distributor plate 502 in position on top of the spring plate 304. It should be appreciated that the holes for receipt of set screws may be optional such that the set screws, described further below, simply engage the top surface of the force distributor plate 502.

The force distributor plate 502 is used to exert downward force on the spring plate 304 to thereby exert additional downward force on that portion of the flexible circuit 200 having the plurality of sensor electrode contact points 202 and to further or ensure the physical contact between the plurality of sensor electrode contact points 202 and the corresponding plurality of sensors under this portion of the flexible circuit 200.

Figure 6:
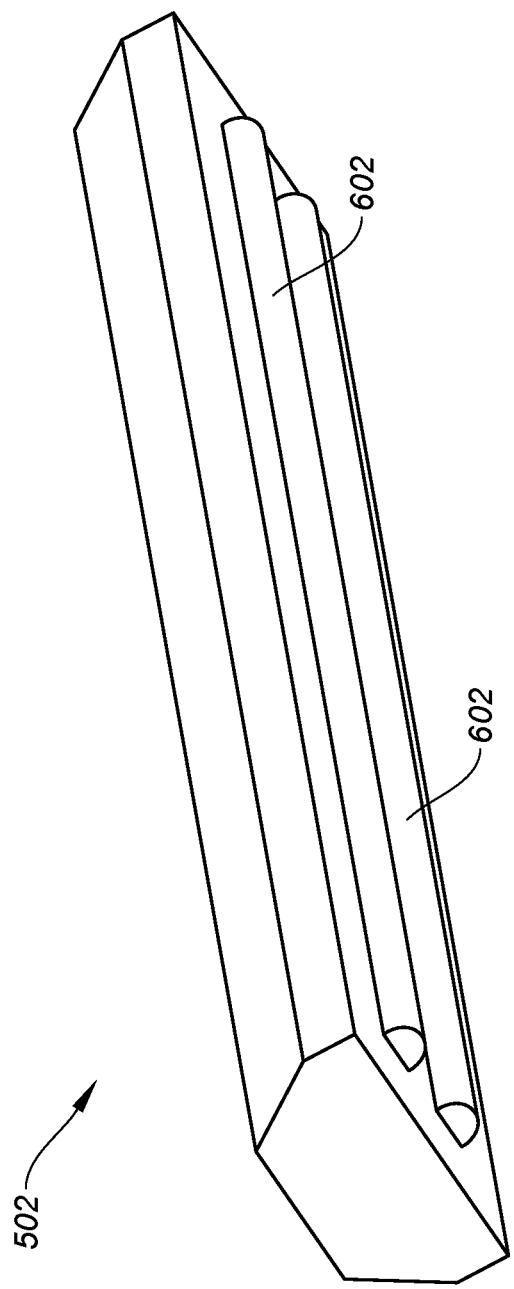
FIG. 6 illustrates a bottom perspective view of the force distributor plate of FIG. 5 according to one embodiment of the present invention.

FIG. 6 illustrates a bottom perspective view of the force distributor plate of FIG. 5 according to one embodiment of the present invention. The force distributor plate 502 is basically a bar of material, such as metal, that has a series of semicircular protrusions 602 on its bottom side extending in a downward direction. Accordingly, when set screws are applied against the top of the force distributor plate 502 these semicircular protrusions will engage and apply force to the top of the spring plate 304 in an even manner. It should be appreciated that in some embodiments, the functions of the spring plate and the force distributor plate may be combined in one plate. In that case, the bottom surface of that single plate would have the features of the spring plate and the top portion of that single plate would be such that it would accept the application of a force being applied, such as through the use of set screws as shown in connection with FIG. 6 or another adjusting device. It should be appreciated that other components or other devices known in the art could be used in place of set screws to apply an adjustable amount of force on top of the force distributor plate or the combined spring plate and force distributor plate.

Figure 7:
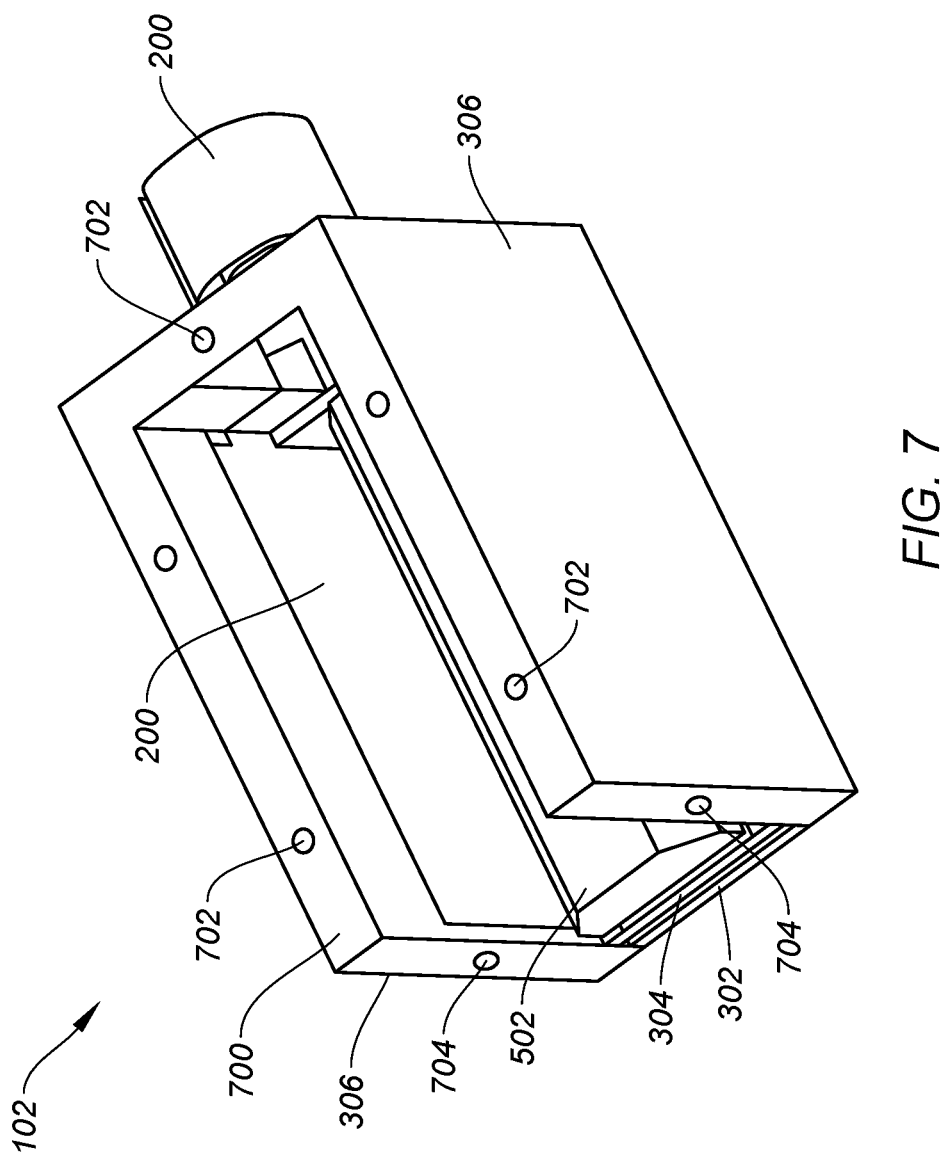
FIG. 7 illustrates a top perspective view of the sensor housing unit of the sensor housing assembly of FIG. 1.

FIG. 7 illustrates a top perspective view of the sensor housing unit of the sensor housing assembly of FIG. 1. The sensor housing unit 102 comprises a body 700 that provides the mechanical support for the sensor housing assembly 100 (see FIG. 1) and provides support and alignment of the internal components, such as the spring plate 304 and the force distributor plate 502. The body 700 also provides a measure of protection for the internal components from the surrounding environment during use. The body 700 is U-shaped and fits around the walls 306 of the flexible circuit 200 such that the flexible circuit 200 is within the body 700. The body 700 forms a hole through which the flexible circuit 200 passes such that the coiled portion of the flexible circuit 200 is outside of the body 700 for connection with the cable conduit 104. It should be appreciated that the bottom of the body 700 will be disposed on the surface of the substrate of interest such that the perimeter of the sensor array 302 is essentially within the U-shaped space of the body 700 once disposed on the surface of the substrate. As depicted, the sensor array 302 is within the walls of the body 700. Screw holes 702 are provided on the top surface of the body 700 for attachment of a top or lid to the body 700 as described below. Additional screw holes 704 are provided on the sides of the ends of the U-shaped portion of the body 700 for attachment of a back cover to the body 700 as also described below.

It should be appreciated that in some embodiments, in particular those in which the surface of the circuitry providing the sensor electrode contact points, such as that portion of the flexible circuitry 200 providing the sensor electrode contact points 202 as shown in connection with FIG. 2, is other than flat, the other components of the overall housing may also be contoured as necessary to the same shape as that portion of the circuitry. For example, if that portion of the circuitry providing the sensor electrode contact points is curved to appropriately contact a curved surface of the sensors, then the corresponding spring plate, force distributor plate, and the bottom surface of the body of the housing may each be similarly curved to similarly provide a mating between these components across the entire adjacent surface area of each component. Alternatively, it should be appreciated that only the bottom surface of the spring plate that contacts the top surface of the circuitry may be curved. Alternatively still, depending upon the contour of the top surface of the circuitry or the vehicle providing the circuitry, in some embodiments, no contouring of the spring plate or the force distributor plate is necessary.

Figure 8:
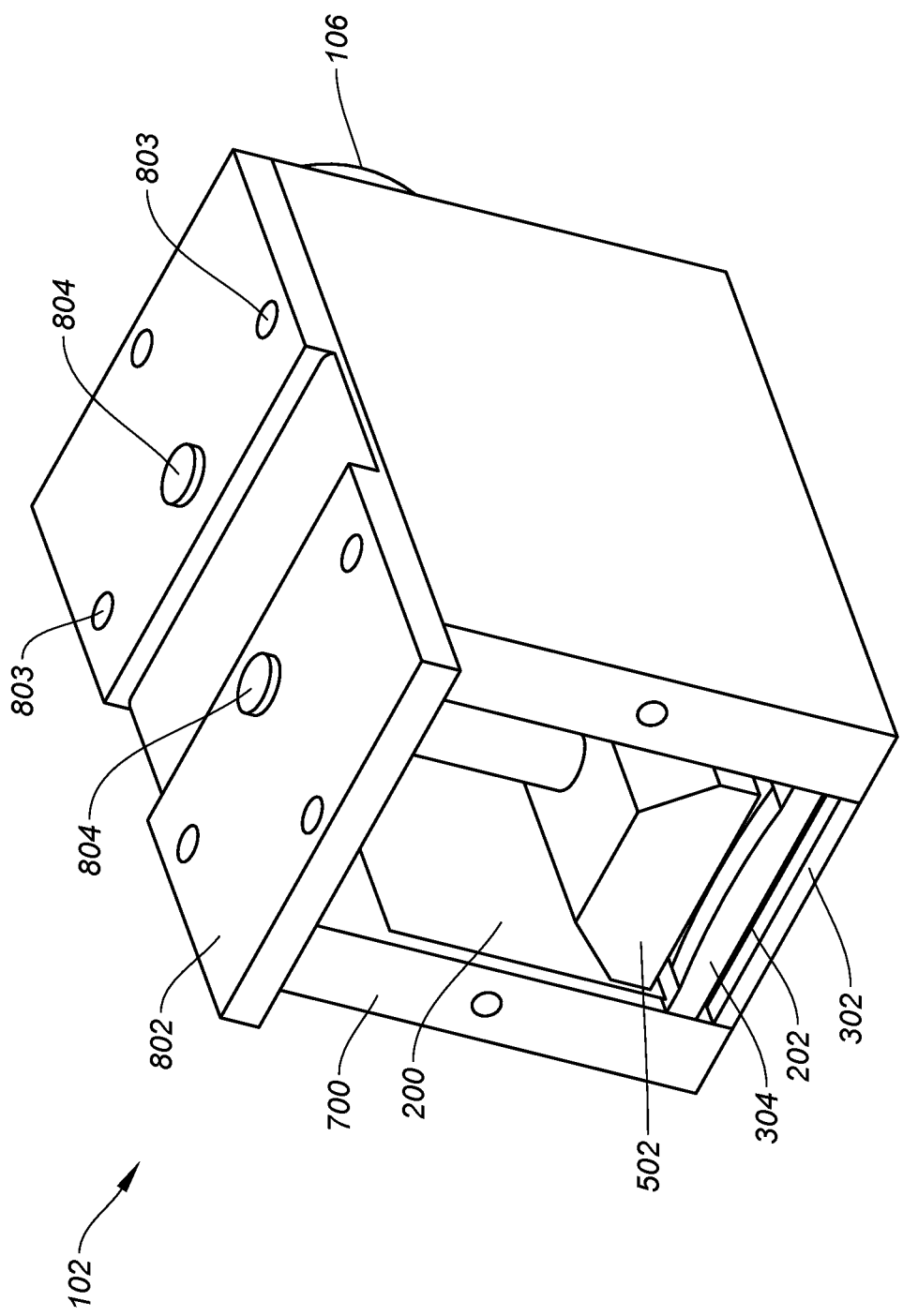
FIG. 8 illustrates a rear side perspective view of sensor housing assembly of FIG. 1 according to one embodiment of the invention.

FIG. 8 illustrates a rear side perspective view of sensor housing assembly of FIG. 1 according to one embodiment of the invention. As described above, the sensor housing assembly 100 comprises a sensor housing unit 102, a flexible circuit 200 with a flat portion having the plurality of sensor electrode contact points 202 (see FIG. 2) disposed within the sensor housing unit 102 that is in-turn disposed on top of, and electrically connected to, a sensor array 302 on the surface of a substrate of interest. On top of that portion of the flexible circuit 200 having the plurality of sensor electrode contact points 202 is a spring plate 304, and on top of the spring plate 304 is a force distributor plate 502. As shown, each of these components reside essentially within the U-shaped body 700 of the sensor housing unit 102. On the opposite front side of the sensor housing assembly 100 is a cable bracket or connector 106 for attachment to a cable conduit 104 (see FIG. 1) through which wires or cable leads pass from the connection busses on the flexible circuit 200 disposed on the outside of the sensor housing unit 102 to a pulser, computer, or computer processor. As depicted, a lid 802 is attached to the top surface of the body 700 of the sensor housing unit 102. The lid 802 is placed in such a position that it serves to cover various elements of sensor housing unit 102, including, but not limited to, the flexible circuit 200, the spring plate 304, and the force distributor plate 502. The lid 802 is attached to the body 700 using screws inserted into the screw holes 803 in the lid 802, which in turn pass into the screw holes 702 located on the top surface of the body 700 as described above in connection with FIG. 7. Set screws 804 pass through the lid 802 into the holes in the top surface of the body of the force distributor plate 502 or simply onto the top surface of the force distributor plate 502. Accordingly, it should be appreciated that the set screws are accessible from outside of the sensor housing assembly. In use, the set screws 804 may be adjusted to exert downward pressure on the force distributor plate 502 to in-turn exert downward force on the spring plate 304 to further the physical contact between the plurality of sensor electrode contact points 202 and the sensors in the sensor array 302 on the surface of a substrate of interest.

Figure 9:
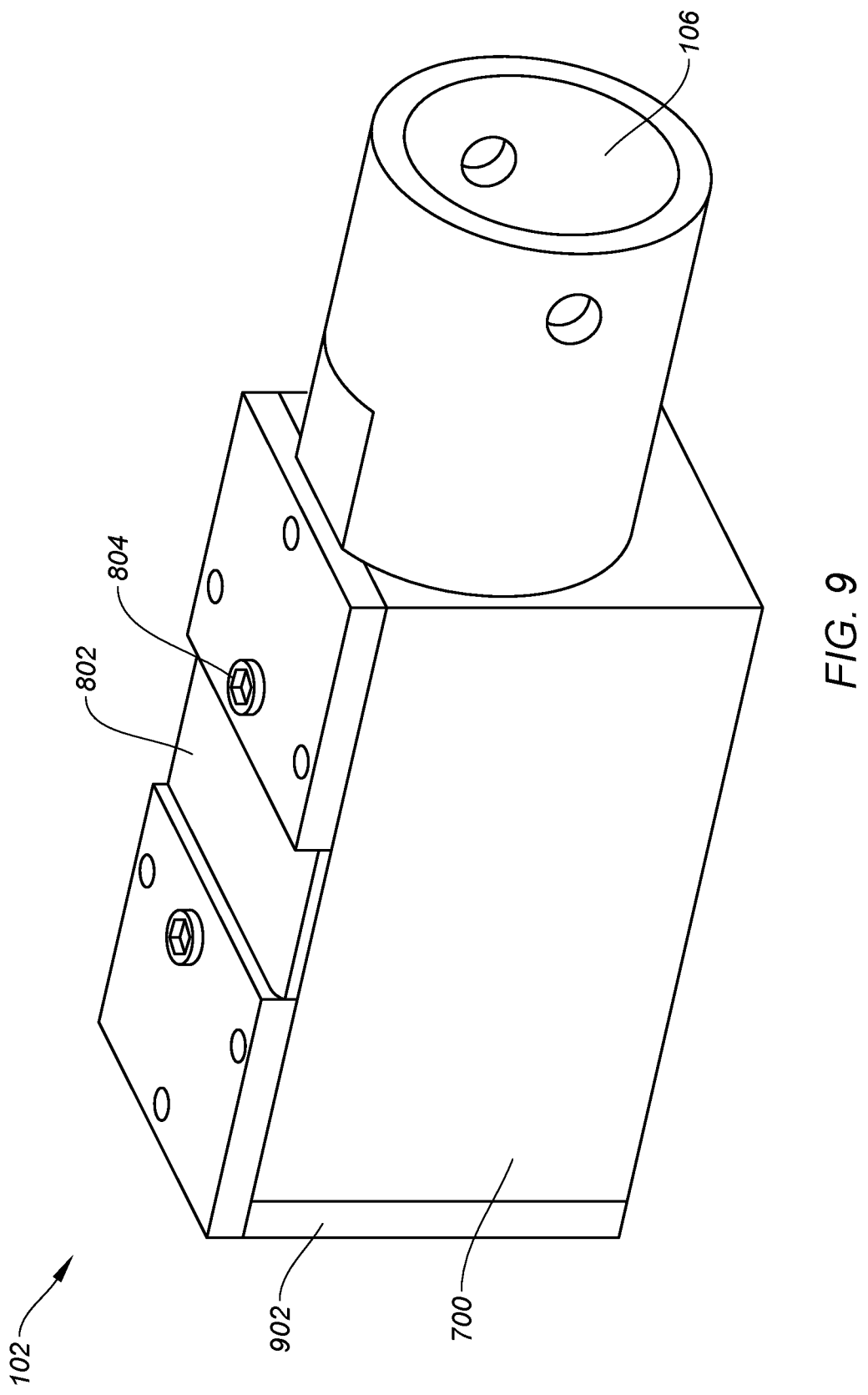
FIG. 9 illustrates a front side perspective view of the sensor housing assembly of FIG. 1 according to one embodiment of the present invention.

FIG. 9 illustrates a front side perspective view of the sensor housing assembly of FIG. 1 according to one embodiment of the present invention. As shown, a rear cover 902 is attached to the sensor housing unit 102 to enclose the rear of the sensor housing assembly 100. The rear cover 902 may be attached using screws inserted into the screw holes (not shown) in the rear cover 902 and through the screw holes 704 located on the surface of the body 700 as described above in connection with FIG. 7. It should be appreciated that the combination of the U-shaped body 700, the lid 802, and the rear cover 902 provides for enclosure of the internal components of the sensor housing assembly, including the flexible circuit 200 (not shown), the spring plate 304 (not shown), and the force distributor plate 502 (not shown). Such enclosure provides protection for these components from the surrounding environment during use. It should be appreciated that the bottom of the sensor housing assembly 102 exposes the flat portion of the flexible circuit 200 having the plurality of sensor electrode contact points 202 so that these can be physically contacted with the sensors or sensor array 302 (not shown) on the surface of a substrate of interest to provide an electrical connection between the sensor array 302, including the sensor electrodes, and the flexible circuit 200. It should also be appreciated that the flexible circuit 200 (not shown) passes through a hole in the U-shaped body 700 of the sensor housing unit 102 such that the folded or coiled portion of the flexible circuit 200 is outside of the sensor housing unit 102. As noted, this folded or coiled portion of the flexible circuit 200 is connected to wire or cable leads through connection busses on the flexible circuit 200. This folded or coiled portion of the flexible circuit 200 and the corresponding wire or cable leads are held with the cable conduit 104. The cable conduit 104 (not shown in FIG. 9) is connected to the sensor housing unit 102 by the cable bracket or connector 106. Further, the set screws 804 are exposed and may be adjusted from outside of the sensor housing assembly 102 as described above in connection with FIG. 8.

As described elsewhere in the instant application, including, but not limited to, the descriptions provided in conjunction with one or more of FIGS. 1-9, a sensor housing unit, such as the sensor housing unit 102, may enable measurement of signals from a plurality of sensors, such as a plurality of sensors installed directly on a substrate of interest. Purely as a non-limiting example, a sensor housing unit, such as the sensor housing unit 102, may physically contact a plurality of sensors or a sensor array through a plurality of sensor electrode contact points, such as the plurality of sensor electrode contact points 200 described in connection with FIG. 2, thus creating an electrical connection between the sensor housing unit 102 and the plurality of sensors, including the sensor electrodes. As a result, the plurality of sensors may transmit information, via electrical signals, through the sensor housing unit 102 to an end user or application. It should be appreciated, therefore, that a user may utilize the sensor housing unit 102, at least as described above, to conduct measurements on a substrate surface of interest. Purely as a non-limiting example, a user may utilize the sensor housing unit 102, at least as described above, to measure specific attributes of a given substrate, such as a substrate volume. Following is a description of the methods for fabricating of an array or plurality of sensors on the surface of a given substrate and attachment of the sensor housing assembly, including the sensor housing unit 102 to the sensor array or plurality of sensors on the surface of a given substrate.

Figure 10:
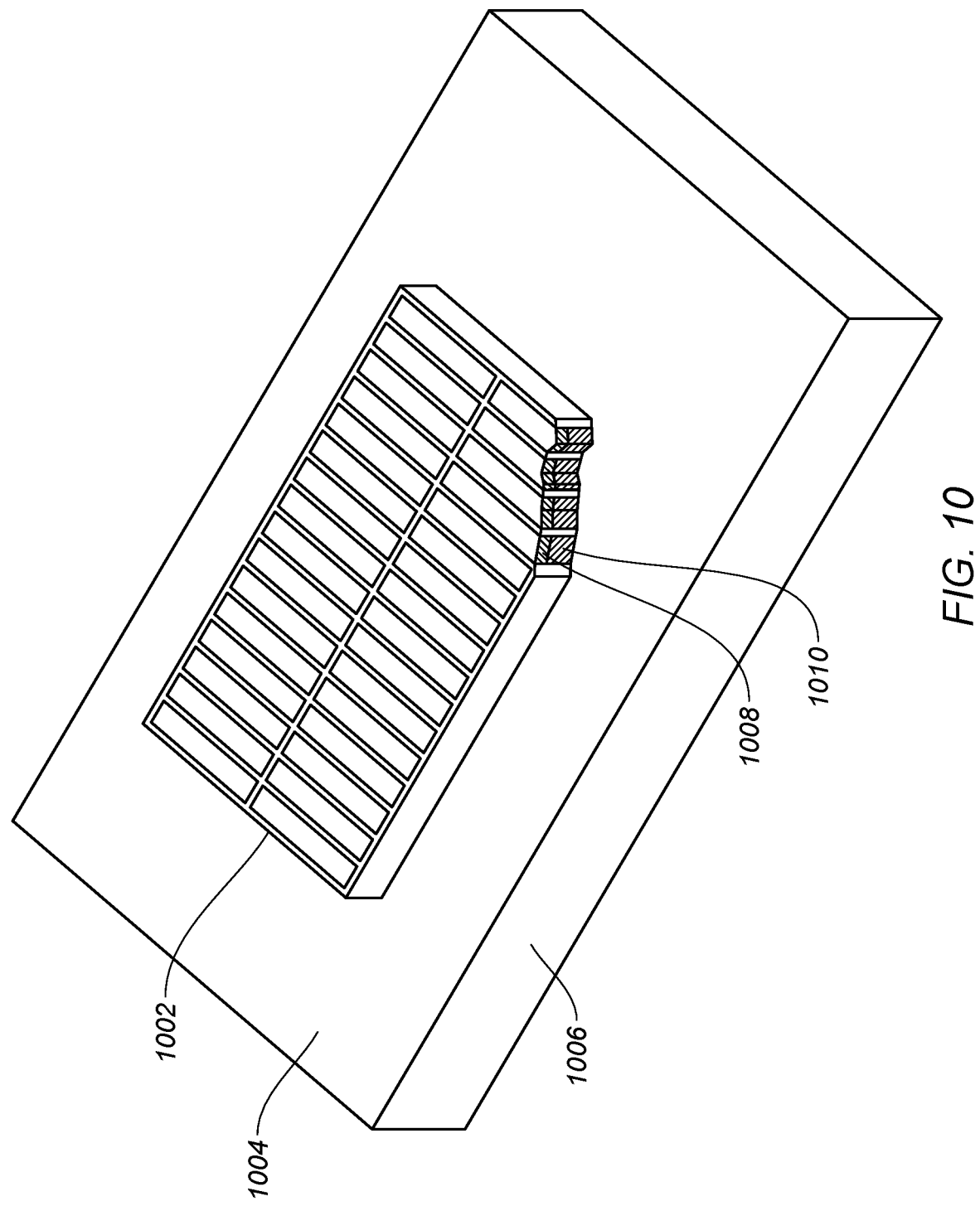
FIG. 10 illustrates a top perspective view of a plurality of sensors that have been fabricated on the surface of a substrate of interest according to one embodiment of the invention.

FIG. 10 illustrates a top perspective view of a plurality of sensors that have been fabricated on the surface of a substrate of interest according to one embodiment of the invention. As depicted, an array of sensors 1002, such as a sol-gel array or array of ultrasonic probes, is disposed on a surface 1004 of a substrate of interest 1006. A partial cut-away of the sensor array 1002 is given in FIG. 10 to illustrate that the sensor array 1002 comprises two layers, namely, a sensor element layer 1008 and a sensor electrode layer 1010. It should be appreciated that the sensor element layer 1008 may comprise a plurality of sensor elements. It should further be appreciated that the sensor electrode layer 1010 may comprise a plurality of sensor electrodes. The sensor element layer 1008 and sensor electrode layer 1010 are in both physical and electrical contact with each other such that during use responses from the substrate of interest 1006 can be detected on the surface 1004 of the substrate of interest 1006 by the sensor element layer 1008, which can then be electrically passed to the sensor electrode layer 1010. It should be appreciated that in some embodiments, the present invention can be made and used with just one sensor, in, for example, a degenerate array, as opposed to a plurality of sensors. In that case, however, the following procedure for constructing the sensor, as well as the above description for the construction and use of the housing can be the same.

Figure 11:
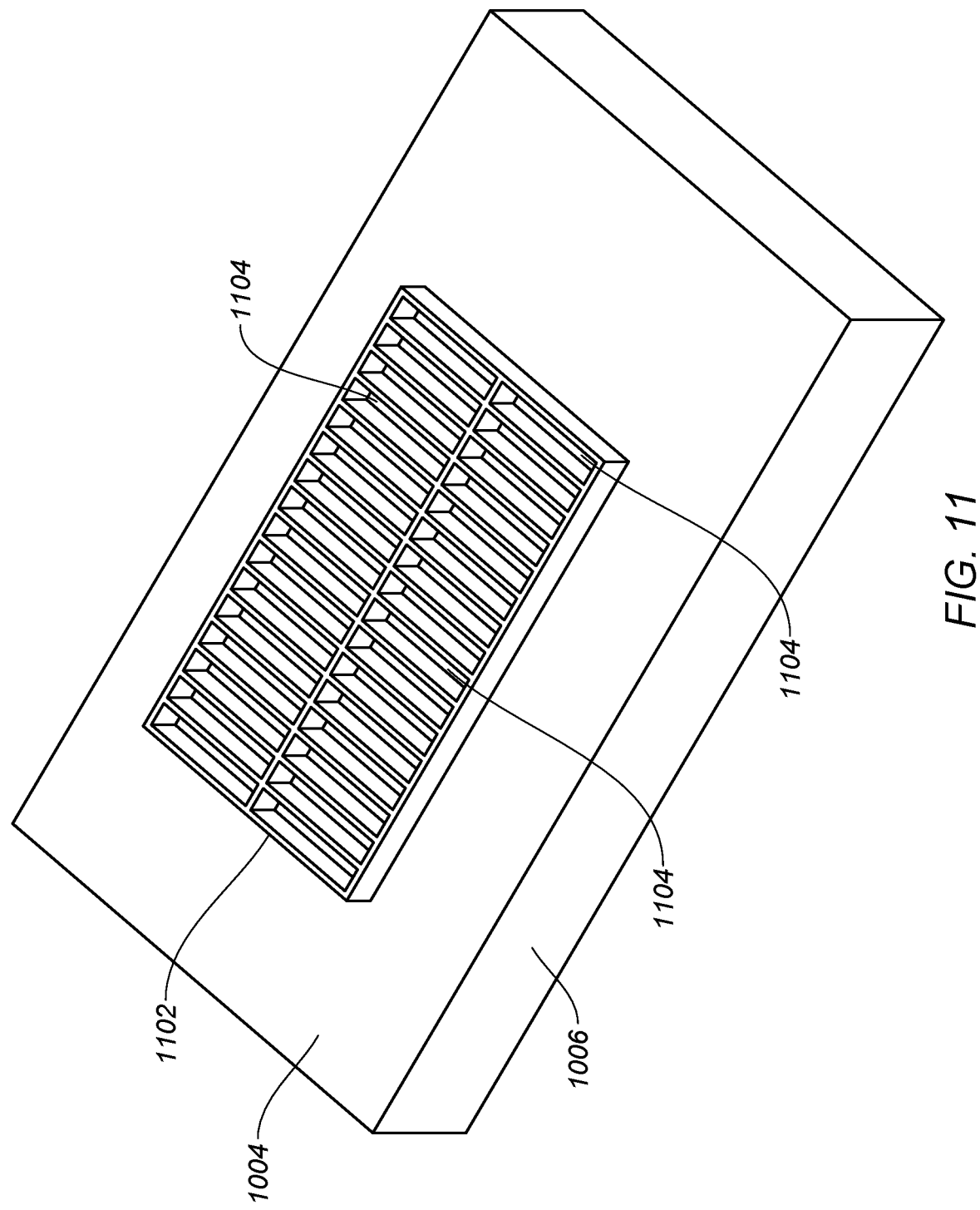
FIG. 11 illustrates a template disposed on the surface of a substrate of interest for receiving a sol-gel for purposes of fabricating a sol-gel sensor array according to one embodiment of the present invention.

FIG. 11 illustrates a top perspective view of a template disposed on the surface of a substrate of interest for receiving a sol-gel for purposes of fabricating a sol-gel sensor array according to one embodiment of the present invention. As described previously, the invention in its various embodiments comprises methods for fabricating a plurality of sensors, such as the sensor array 1002 shown in FIG. 10, directly on the surface of a substrate of interest, such as the substrate 1006 also shown in FIG. 10. This embodiment of fabricating the sensor array directly on the surface of a substrate of interest is in contradiction to pre-fabricating a sensor array prior to its placement on a substrate of interest and then attaching it in the field to a given substrate just prior to use. Purely as a non-limiting example, one method for fabricating a sol-gel array on the surface of a substrate of interest includes generally forming the sensor element layer, such as the sensor element layer 1008, on the substrate surface followed by forming the sensor electrode layer 1010 on top of the sensor element layer 1008.

To perform this method of fabrication, a template 1102 having a plurality of open receptacles 1104 that form an array is disposed on the surface 1004 of the substrate of interest 1006. The template 1102 is secured to the surface 1004 of the substrate of interest 1006. For example, the template can be manufactured with tabs, wings, or other extraneous features or portions that allow the template to be clamped to the surface of interest and thereby held in place while the receptacles are being filled with sensor material. Such portions could be provided by making the template oversized and only cutting receptacles where they are needed, thus leaving additional portions of the template available to secure the template to the surface of interest. Also, for example, the template could be fabricated to have a larger than needed number of receptacles, and the area of the template containing the extraneous receptacles could be held under a clamp while the relevant ones are filled with the sensor material. Another alternative could be to bond the template to the substrate rather than clamp it. It should be appreciated that the template 1102 outlines a physical footprint for the sensor array to be installed directly on the substrate surface 1004. It should also be appreciated that while a sol-gel has been described in connection with this FIG. 11, the sol-gel may encompass slurry-based, spray-on, or thick-film phased array constructions as well.

Figure 12:
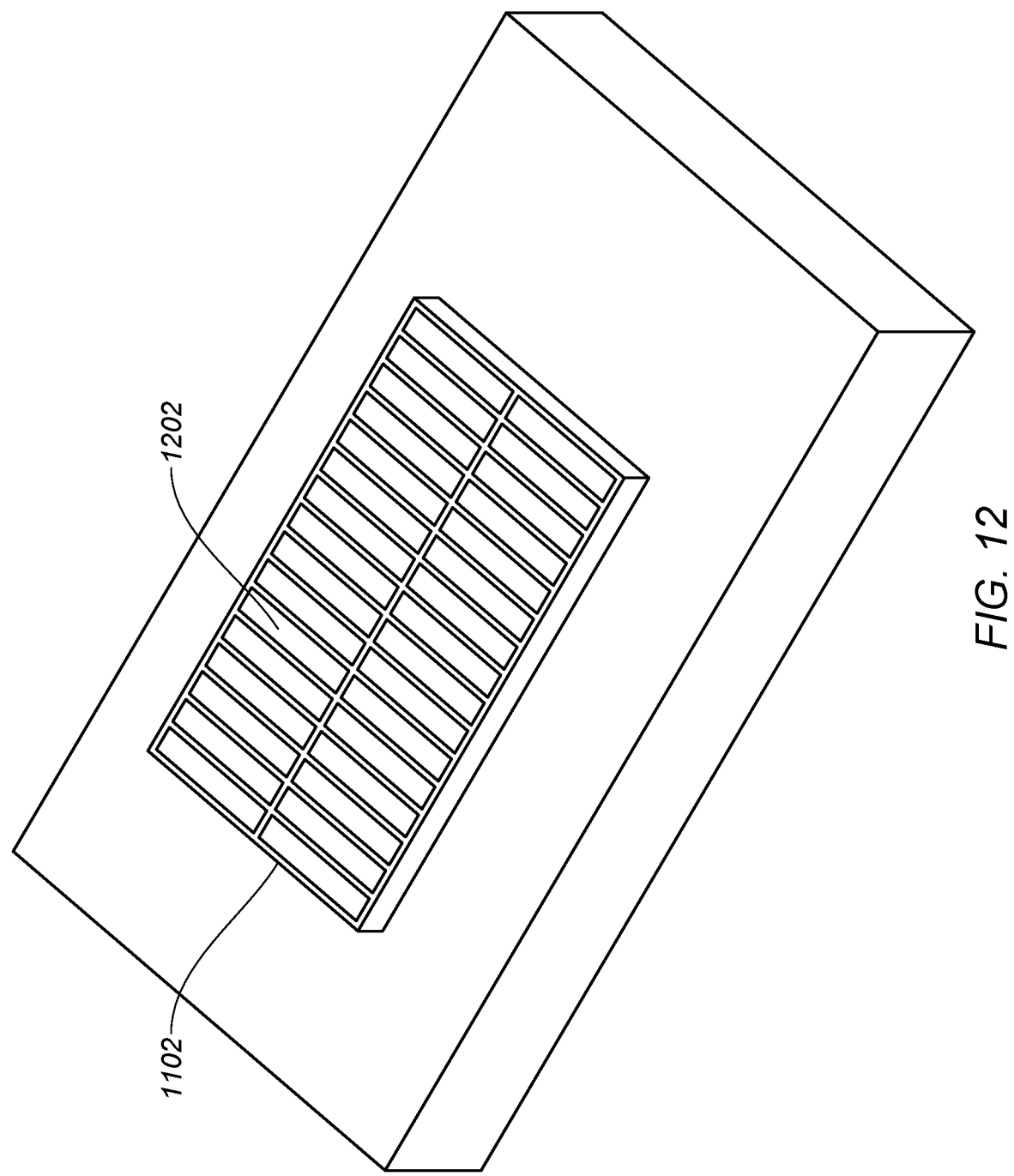
FIG. 12 illustrates a top perspective view of the template disposed on the surface of a substrate of interest of FIG. 11 with the addition of sol-gel according to one embodiment of the present invention.

FIG. 12 illustrates a top perspective view of the template disposed on the surface of a substrate of interest of FIG. 11 with the addition of sol-gel according to one embodiment of the present invention. Once the template 1102 is in place, a sol-gel 1202 may be sprayed or painted into each receptacle 1104 to form the sensor element layer 1008 and, correspondingly, a plurality of sensors. It should be appreciated that after the sol-gel is applied, various methods, such as back-sanding, may be utilized to remove excess sensor or sol-gel material to provide the desired thickness and to ensure a uniform top or exposed surface of the sensor element layer 1104 before further fabricating the sensor array. Also it should be appreciated as noted above, that the present invention is not limited to using a sol-gel material as other materials can be used to form the sensor array.

Figure 13:
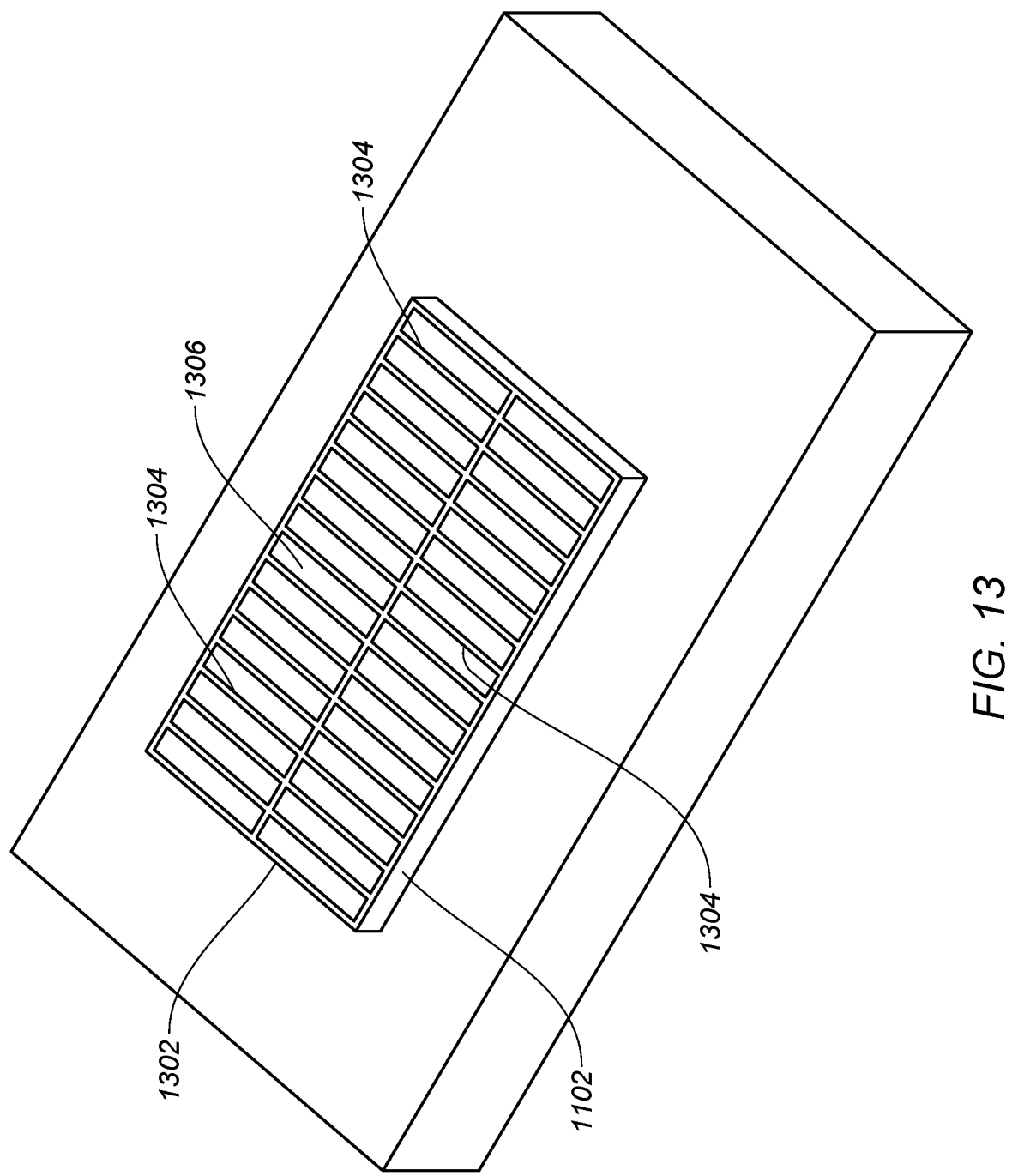
FIG. 13 illustrates a top perspective view of a second template disposed on top of the first template of FIG. 12 with the addition of electrode material according to one embodiment of the present invention.

FIG. 13 illustrates a top perspective view of a second template disposed on top of the first template of FIG. 12 with the addition of electrode material according to one embodiment of the present invention. Once the first or bottom template 1102 is in place and a sol-gel 1202 has been sprayed or painted into each receptacle 1104 to form the sensor element layer 1008, a second or top template 1302 can be placed and aligned on top of the first template 1102. Similar to the first template 1102, the second template also has a plurality of open receptacles 1304 that form an array of open receptacles. Accordingly, once the second template 1302 is disposed on top of the first template 1102 and aligned, the open receptacles 1304 of the second template 1302 will be positioned directly on top of a corresponding receptacle 1104 of the first template 1302. Therefore, each of the receptacles 1304 of the second template 1302 will be located directly on top of a corresponding sensor element. The second template 1302 can be secured to the first template 1102 in the same fashion as the first template. In some embodiments it may be advantageous to add positioning tabs to the second template that mate with the outer edges of the first template so that the second template is easily placed in proper alignment with the first template.

After positioning the second template properly, an electrode material 1306 can be deposited into the receptacles 1304 of the second template 1302. It should be appreciated that the electrode material forms the sensor electrode layer 1010, and correspondingly a plurality of sensor electrodes which are in physical and, therefore, electrical contact with each of the corresponding plurality of sensors in the sensor element layer 1008. It should be appreciated that the sensor array 1002 can be constructed such that each sensor element within a given receptacle 1104 corresponds to a given sensor electrode within the corresponding receptacle 1304 directly above the sensor element. It should be appreciated that a second electrode for a given sensor element may be the component or substrate surface, as typically a set of two electrodes per sensor element are required. It should be appreciated that after the electrode material is applied, various methods, such as backsanding, may be utilized to remove excess electrode material to ensure no electrical shorting. In this manner a complete array of sensors is formed or fabricated on the surface of the substrate of interest.

It should be appreciated that the templates 1102, 1302 used for the sensor element layer 1008 and the sensor electrode layer 1010 may be made from a material that can withstand high operating temperatures, such as a high-temperature-tolerant ceramic material with good dielectric properties. In this case, it should be appreciated that the templates may serve as a housing for the plurality of sensors in the sensor element layer 1008 and the corresponding plurality of electrodes in the sensor electrode layer 1010. Alternatively, in another embodiment, the templates 1102, 1302 used for the sensor element layer 1008 and the sensor electrode layer 1010 may be made from a material having a low melting point such that the templates will melt away after the sensor element layer 1008 and the sensor electrode layer 1010 have been formed. It should also be appreciated that the templates can be formed having extra material along their edges for use in securing the position of the template during fabrication of the corresponding sensor layer 1008, 1010. In addition, the templates 1102, 1302 used for the sensor element layer 1008 and the sensor electrode layer 1010 may be shaped to conform to the contour of the surface of a substrate of interest that may be curved or non-planer.

Based on the above description, a user can fabricate a sensor array on a surface of a substrate of interest, for example, using the method of the present invention described above in connection with FIGS. 10-13, and then utilize the sensor housing assembly, such as the one described above in connection with FIGS. 1-9, in conjunction with the sensor array to collect data from the substrate of interest. For example, a user would first fabricate a sensor array, such as a sol-gel phased array as shown in FIG. 10, and then place the sensor housing assembly over the sensor array on the substrate of interest. By placing the sensor housing assembly over the sensor array and by adjusting the set screws to provide a physical and, therefore, an electrical connection between the sensor array, specifically between the sensor electrode layer of the sensor array and sensor electrode contact points that are part of the flexible circuit within the sensor housing unit, the user can collect data electrically from the plurality of sensors within the sensor element layer that are physically adjacent to a surface of a substrate of interest and communicate that data to the flexible circuit and to the attached cable or wire leads that ultimately connect to a pulser, computer, or computer processor.

In some embodiments, the U-shaped body is attached around the sensor array in such a way as to surround the perimeter of the array. The sensor housing can be held to the substrate surface by a strap or other clamp that secures the housing to the surface. One embodiment of such a strap is to fasten a hose clamp or similar device around the substrate of interest and over the top of the sensor housing. For example, if the substrate of interest is a circular pipe, a hose clamp can extend around the pipe and the sensor housing, thereby securely attaching the sensor housing to the substrate. For ferromagnetic substrates, clamps that employ magnetic contacts may be used instead of a strap. For specialized component configurations that do not admit either of these fastening mechanisms, the sensor housing can be modified to provide portions that facilitate the use of another fastening or strapping mechanism. For example, tabs, wings, or other portions may be made with the housing, either integrally or attached, and used to attach the housing to the substrate of interest.

It should be appreciated that in those embodiments in which the template used in fabricating the sensor array has tabs, wings, or other oversized features or portions and is left in place after the sensor array has been formed, the sensor housing may not fully reach to the substrate surface. In those embodiments, the sensor housing may simply rest on the template or those particular features of the template. In some embodiments, the template may include positioning features such as positioning clips or recesses designed to accept the sensor housing in the proper alignment with the rest of the sensor array.

It should be appreciated that a user utilizing embodiments of the present invention to directly install a sensor array on a substrate of interest need not place any additional material between the sensor element layer and the surface of the substrate of interest. Such additional material includes, but is not limited to, a glue layer, a couplant layer, or the like. One of skill in the art will therefore recognize that the embodiments described above (e.g., in conjunction with FIGS. 10-13) provide an easy and cost-effective method of installing a plurality of sensors on a substrate surface.

Additionally, a skilled artisan will appreciate that the embodiments described above disclose a means to install a plurality of sensors on any substrate surface without a need to manufacture any of the plurality of sensors in a laboratory or factory prior to attachment to a substrate of interest. Thus, a user utilizing the above embodiments may install the plurality of sensors at any site of interest, including, but not limited to, any field site or any field measurement site, without a need to manufacture any of the plurality of sensors beforehand. It should therefore be appreciated that the above embodiments allow field deployment of a plurality of sensors, including, but not limited to, a plurality of ultrasonic sensor probes, in an easy and readily-accessible manner. It should be appreciated that without the process and hardware described in this invention, it could be prohibitive to install such a sensor or sensor array in the field due to the need for precise forming and placement of neighboring sensor elements. Additionally, the task of electroding an array of sensors installed directly onto a component substrate in the field is very difficult. If the environment is unfriendly to humans, it is paramount to be fast and efficient when doing work. Moreover, mistakes could easily be made when mating cables with their intended sensor element. Accordingly, it is generally easier to fabricate a complete sensor in the laboratory or factory and then take it to the field and bond it in place. However, the present invention allows a practical method of fabricating a sensor directly onto its intended destination and provides a housing for the sensor array and corresponding electrical connections for use. The present invention represents an improvement to pre-fabricated sensors by providing geometric conformance and avoiding materials such as couplants, glue, or matching layers as the sensor is fabricated directly onto the component or substrate of interest.

Various embodiments of the invention have been described above. However, it should be appreciated that alternative embodiments are possible and that the invention is not limited to the specific embodiments described above. In addition, while the invention has been described as having particular application in high temperature or high radiation environments, the invention may be used in other challenging environments as well where it may be more desirable to fabricate a sensor array directly on the substrate of interest and utilize a self-contained housing assembly to provide an electrical connection from the sensors to a remote pulser, computer, or computer processor.

What is claimed is:

1. A sensor for collecting information about a substrate, comprising:
   at least one sensor disposed on the surface of a substrate for collecting information about the substrate;
   a circuitry having a first portion comprising at least one electrical contact electrically connected to said at least one sensor and a second portion comprising a corresponding at least one electrical contact for electrical connection to a corresponding at least one wire;
   a plate adjustably disposed on top of said first portion of said circuitry to exert a downward force on said first portion of said circuitry;
   a body that covers said circuitry and said plate and that is disposed around or on top of said at least one sensor, wherein said body defines an opening and wherein said circuitry extends through said opening such that said second portion of said circuitry is disposed outside of said body.

2. The sensor of claim 1, further comprising a component in contact with a top surface of said plate and accessible from outside of said body, wherein said component can be adjusted to apply a predetermined amount of force to the top of said plate.

3. The sensor of claim 1, further comprising a plurality of sensors, wherein said circuitry further comprises a plurality of electrical contacts, each electrically connected to a corresponding one of said plurality of sensors, and wherein said second portion further comprises a second plurality of electrical contacts for electrical connection to a corresponding plurality of wires.

4. The sensor of claim 3, further comprising:
   a second plate having a top surface and disposed on top of said plate; and
   a component in contact with said top surface of said second plate and accessible from outside of said body, wherein said component can be adjusted to apply a predetermined amount of force to the top of said second plate.

5. The sensor of claim 3, wherein said plurality of sensors comprises a plurality of sensor elements and a plurality of sensor electrodes fabricated on the surface of the substrate.

6. The sensor of claim 5, wherein said plurality of sensor elements forms a first layer disposed on the surface of the substrate and wherein said plurality of sensor electrodes form a second layer disposed on top of said first layer.

7. The sensor of claim 3, further comprising:
   a plurality of wires electrically connected to said second plurality of electrical contacts; and
   a conduit connected at a first end to said body at said first opening and wherein said plurality of wires extend from said second plurality of electrical contacts through said conduit for electrical connection at a second end of said conduit to a computing device.

8. A housing for a sensor array disposed on a substrate surface, comprising:
   a circuitry having a first portion comprising a first plurality of electrical contacts for electrical connection to a plurality of sensors within a sensor array disposed on a substrate surface and a second portion comprising a second plurality of electrical contacts for electrical connection to a corresponding plurality of wires;
   a plate adjustably disposed on top of said first portion of said circuitry to exert a downward force on said first portion of said circuitry;
   a body that covers said circuitry and said plate and that is configured to fit around or on top of the sensor, wherein said body defines an opening and wherein said circuitry extends through said opening such that said second portion of said circuitry is disposed outside of said body.

9. The sensor of claim 8, further comprising a component in contact with a top surface of said plate and accessible from outside of said body, wherein said component can be adjusted to apply a predetermined amount of force to the top of said plate.

10. The sensor of claim 8, wherein said circuitry comprises a flexible circuit.

11. The sensor of claim 8, further comprising:
    a second plate having a top surface and disposed on top of said plate; and
    a component in contact with said top surface of said second plate and accessible from outside of said body, wherein said component can be adjusted to apply a predetermined amount of force to the top of said second plate.

12. The housing of claim 8, further comprising:
    a plurality of wires electrically connected to said second plurality of electrical contacts; and
    a conduit connected at a first end to said body at said first opening and wherein said plurality of wires extend from said second plurality of electrical contacts through said conduit for electrical connection at a second end of said conduit to a computing device.

13. A method for fabricating a sensor on the surface of a substrate, comprising:
    attaching a first template comprising a first plurality of openings to a surface of a substrate;
    disposing a sensor material into each of said openings in said first template thereby creating a sensor;
    attaching a second template comprising a second plurality of openings on top of said first template; and
    disposing an electrode material into each of said openings in said second template;
    attaching a housing to either the surface of the substrate or to said first template, wherein said housing provides a circuit that electrically connects said electrode material in each of said openings in said second template to a corresponding plurality of wires attached to a computing device; and
    collecting data using said sensor array.

14. The method of claim 13, wherein said housing comprises:

a flexible circuit having a flat portion comprising a first plurality of electrical contacts for electrical connection to said electrode material in each of said openings in said second template and a second portion comprising a second plurality of electrical contacts for electrical connection to a corresponding plurality of wires;

a first plate disposed on top of said flat portion of said flexible circuit configured to exert a downward force on said flat portion of said flexible circuit;

a second plate having a top surface and disposed on top of said first plate;

a body that encloses said flat portion of said flexible circuit, said first plate, and said second plate and that is configured to fit around or on top of the sensor, wherein said body defines a first opening and at least one second opening and wherein said flexible circuit extends through said first opening such that said second portion of said flexible circuit is disposed outside of said body; and at least one set screw disposed within said at least one second opening of said body and in contact with said top surface of said second plate.

15. The method of claim 14, wherein said housing further comprises:

a plurality of wires electrically connected to said second plurality of electrical contacts; and a conduit connected at a first end to said body at said first opening and wherein said plurality of wires extend from said second plurality of electrical contacts through said conduit for electrical connection at a second end of said conduit to a computing device.

16. The method of claim 14, further comprising:

adjusting said at least one set screw, thereby ensuring electrical contact between said first plurality of electrical contacts and said electrode material in each of said openings in said second template.

17. The sensor of claim 1, wherein said circuitry comprises a flexible circuit.

18. The sensor of claim 1, further comprising:

a second plate having a top surface and disposed on top of said plate; and a component in contact with said top surface of said second plate and accessible from outside of said body, wherein said component can be adjusted to apply a predetermined amount of force to the top of said second plate.

* * * * *